United States Patent [19]

Moulin

[11] Patent Number: 4,953,944

[45] Date of Patent: Sep. 4, 1990

[54] MULTI-CHANNEL HERMAPHRODITIC LENS TYPE FIBER OPTIC CONNECTOR

[75] Inventor: Norbert L. Moulin, Placentia, Calif.

[73] Assignee: Hughes Aircraft Company, Los Angeles, Calif.

[21] Appl. No.: 256,686

[22] Filed: Oct. 12, 1988

[51] Int. Cl.⁵ .............................................. G02B 6/38
[52] U.S. Cl. ............................................... 350/96.21
[58] Field of Search ........................ 350/96.21, 96.20

[56] References Cited

U.S. PATENT DOCUMENTS

| 4,519,672 | 5/1985 | Rogstadius | 350/96.21 |
| 4,744,628 | 5/1988 | Winter | 350/96.21 |
| 4,766,306 | 8/1988 | Bichsel et al. | 350/96.21 |
| 4,781,431 | 11/1988 | Wesson et al. | 350/96.21 |
| 4,807,957 | 2/1989 | de Jong et al. | 350/96.21 |

Primary Examiner—William L. Sikes
Assistant Examiner—Robert E. Wise
Attorney, Agent, or Firm—Joseph E. Szabo; Terje Gudmestad; Wanda K. Denson-Low

[57] ABSTRACT

A lens type connector (13) comprising a connector body (31) having a passage (47) extending through it in an axial direction and a bushing (35) fixedly retained in the passage (47) of the connector body (31) and having a bushing passage (59) extending axially completely through the bushing. The bushing (35) has a radially inwardly projecting shoulder (61) in the bushing passage (59). A graded index rod (33) is movable axially in the passages (47, 59) so that an end face (77) of the graded index rod (33) can be urged against the shoulder (61) to at least assist in positioning and retaining the graded index rod (33) in the passages (47, 59).

9 Claims, 3 Drawing Sheets

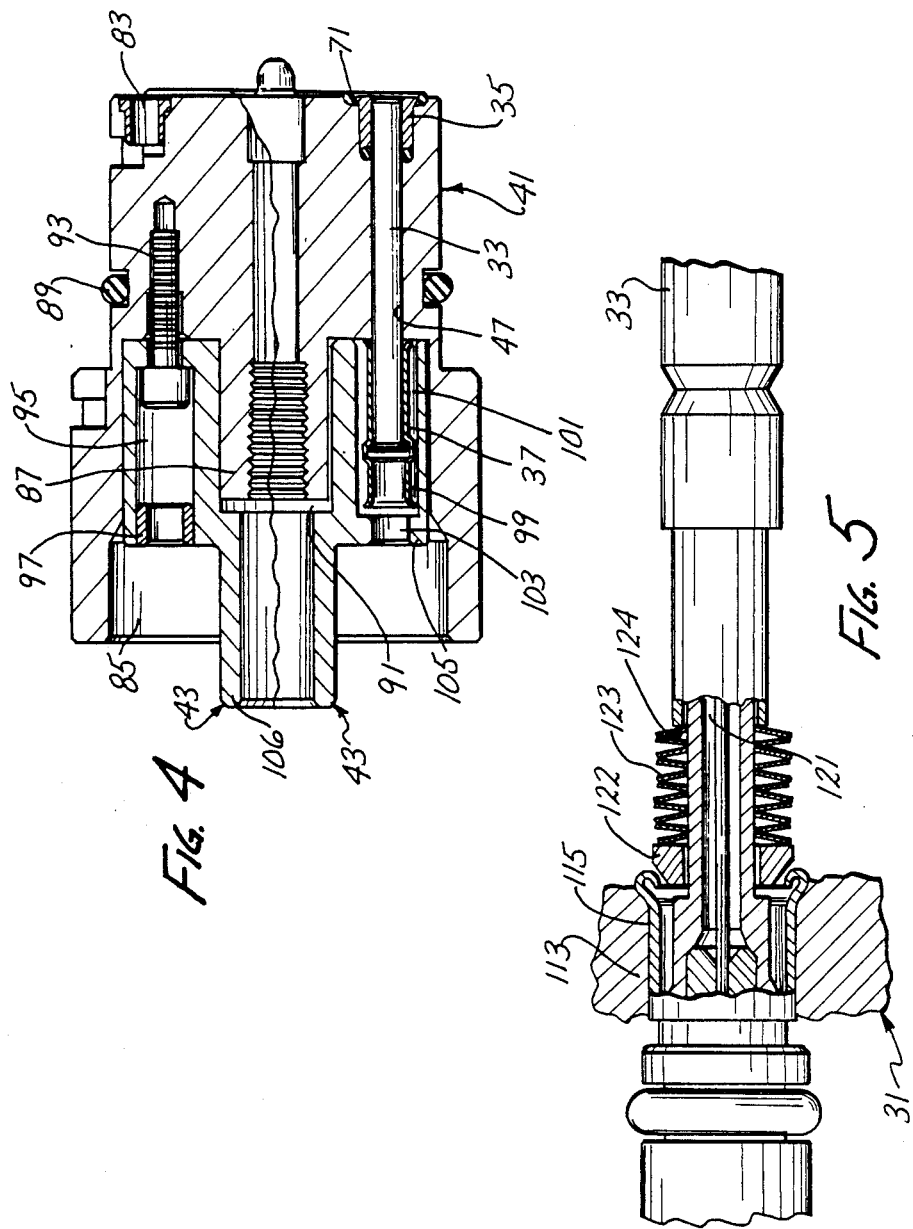

4,953,944

MULTI-CHANNEL HERMAPHRODITIC LENS TYPE FIBER OPTIC CONNECTOR

BACKGROUND OF THE INVENTION

1. Field of the Invention

This invention relates to a lens-type connector for fiber optic termini.

2. Description of Related Art

Lens-type fiber optic connectors interconnect two or more fiber optic termini and provides some optical function intermediate the ends of the fiber optic termini. A lens-type connector may include lenses which, for example, may expand and collimate the optical energy between the fiber optic termini. By expanding and collimating the light beams in this fashion, optical alignment of the beams is facilitated, and optical losses are minimized.

In one prior art construction, the lens-type connector includes a lens having the usual curved surfaces. This requires the use of a glass cover plate at the interface between two interconnected connectors to protect the lenses from the environment and to present a flat surface at the interface. This increases optical power loss in the lens-type connector. In addition, the optical fiber must be aligned and bonded into the system at the factory.

SUMMARY OF THE INVENTION

This invention overcomes these disadvantages by utilizing a graded index rod and associated structure in lieu of the lens system of the prior art. The graded index rod has an end face with a flat region which facilitates cleaning and which eliminates the need for a cover plate to provide a flat surface at the interface between the connectors. Optically, the graded index rod can perform various desired functions, such as beam expansion and collimation.

A pair of lens-type connectors can be releasably joined together in the same manner as non-lens type connectors. They may be identical, and each of them includes a connector body having a passage extending therethrough in a first direction.

An important feature of this invention is the manner in which the graded index rod is positioned and retained in the connector body. This can be accomplished by providing a radially inwardly projecting shoulder in the passage and mounting the graded index rod for movement in the first direction in the passage. Consequently, an end face of the graded index rod can be urged against the shoulder to at least assist in positioning and retaining the graded index rod in the passage.

The radially inwardly projecting shoulder is preferably provided on a multi-purpose bushing. The bushing is fixedly retained in the passage of the connector body and has a bushing passage extending generally in the first direction completely through the bushing. Accordingly, the graded index rod can be positioned in the passage of the bushing and urged against the shoulder provided by the bushing.

Although the end face of the graded index rod can be entirely flat and planar, preferably it includes a peripheral, conical surface, and the shoulder also preferably includes a mating conical surface. These coincal surfaces engage when the graded index rod is urged against the shoulder. The end face of the graded index rod has a flat region radially inwardly of the conical surface of the end face.

The bushing can advantageously be received within a counterbore at one end of the connector body. To accurately position the bushing, the counterbore has a cylindrical portion which at least partially receives the bushing, and the bushing has an external cylindrical surface which is coaxial with the conical surface of the bushing. This accurately orients the conical surface of the shoulder of the bushing and the passage through the connector body.

In addition to its functions of positioning and retaining the graded index rod, the bushing is also used in retaining an annular interface seal and a seal which seals between the connector body and the graded index rod. The interface seal circumscribes the bushing at one end of the connector body, and the bushing has a flange useful in retaining the interface seal. The other seal is retained between an end wall of the counterbore and the bushing.

Another important feature of this invention is that the lens-type connector can be easily disassembled to facilitate field maintenance and allow replacement of various components, including the graded index rod, without disturbing the fiber optic terminus. This is extremely important for applications, such as military applications, where downtime for repair could be very detrimental.

To accomplish this, the graded index rod is slidable in the passage of the connector body, and the connector body includes multiple components which are releasably interconnected. For example, the connector body may include first and second body sections, a carrier adapted to receive at least one fiber optic terminus and means for releasably attaching the body sections and the carrier. Portions of the passage of the connector body are in each of the first and second body sections, and the graded index rod projects into the passage of the connector body in the second body section. With this construction, the lens-type connector can be readily disassembled for repair, cleaning or replacement of components.

The invention, together with additional features and advantages thereof, may best be understood by reference to the following description taken in connection with the accompanying illustrative drawings.

BRIEF DESCRIPTION OF THE DRAWINGS

In the accompanying drawings:

FIG. 4 is a sectional view taken generally along line 4—4 of FIG. 3.

FIG. 5 is an enlarged, fragmentary, elevational view partly in section of a portion of the lens-type connector and terminus.

DESCRIPTION OF THE PREFERRED EMBODIMENTS

Figure 1:
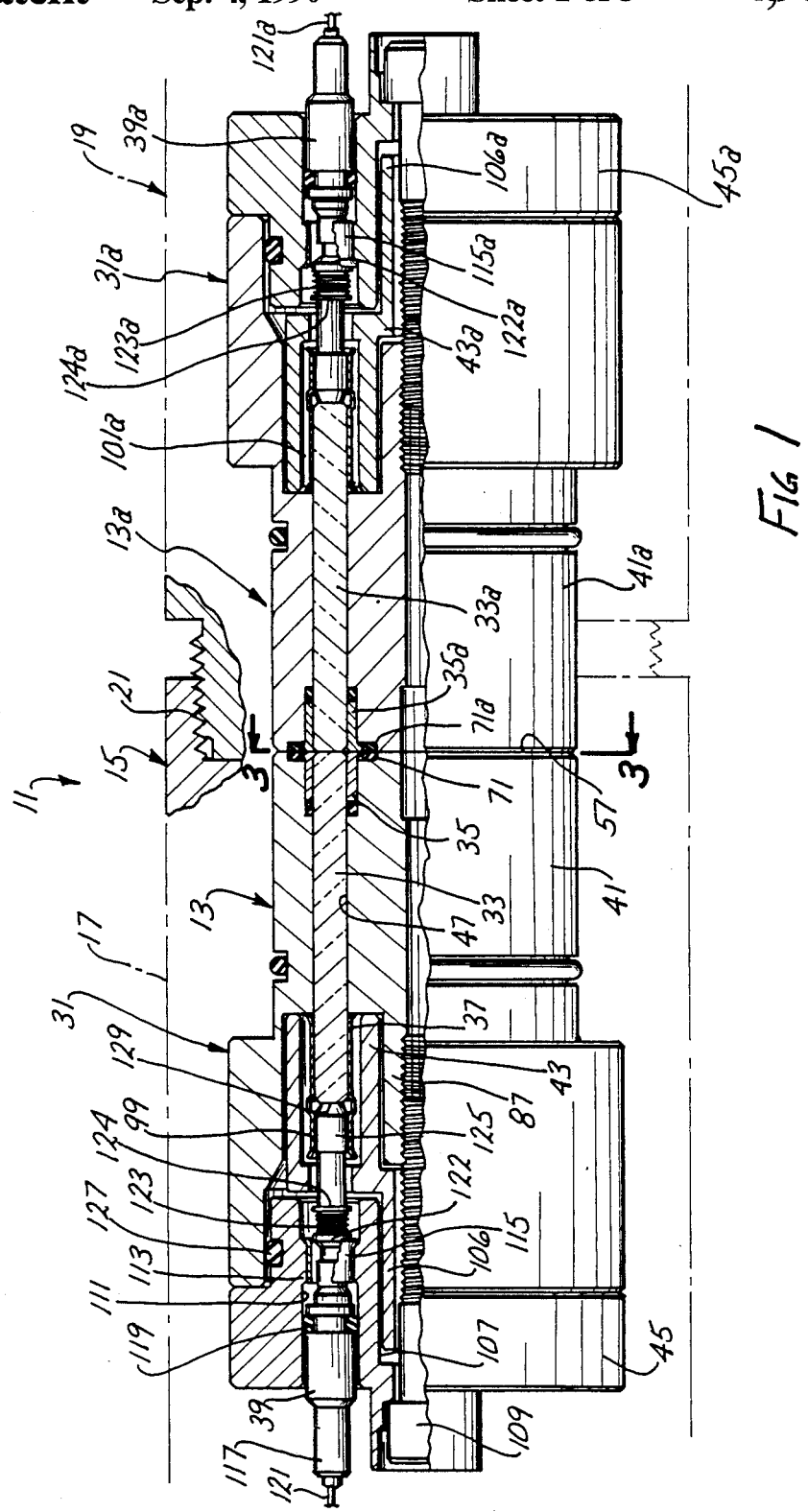
FIG. 1 is an elevational view partially in section of a lens-type fiber optic connector.

Referring now to the drawings in more detail, FIG. 1 shows a lens-type fiber optic connector pair 11 which generally includes connectors 13 and 13a and a conventional coupling 15 for interconnecting the connectors 13. The coupling 15 may be of the same type as those couplings used for joining together the connector halves of non-lens type connectors. Accordingly, the coupling 15 is not described in detail and is merely illustrated as including coupling sections 17 and 19 releasably interconnected by threads 21. Of course, the coupling sections 17 and 19 carry the connectors 13 and 13a, respectively, so that, when the coupling sections are threadedly interconnected, the connectors are coupled together also as shown in FIG. 1.

The connectors 13 and 13a are identical, and so only the connector 13 is described in detail. Portions of the connector 13a corresponding to portions of the connector 13 are designated by corresponding reference numerals followed by the letter "a".

Figure 3:
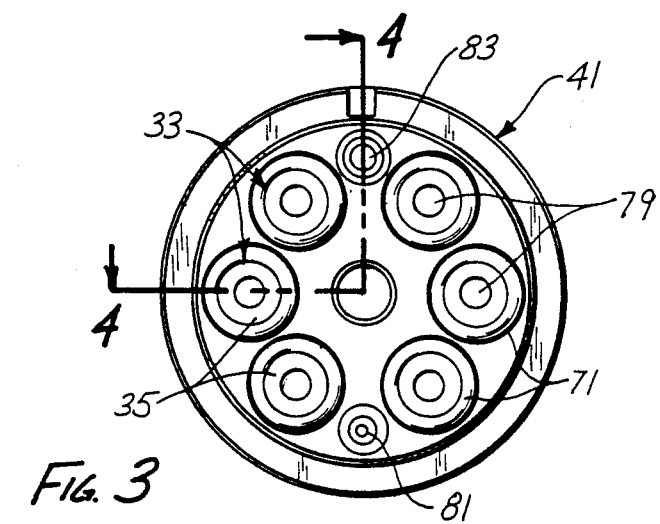
FIG. 3 is an end elevational view taken generally along line 3—3 of FIG. 1.

The connector 13 includes a connector body 31, graded index rods 33, bushings 35, alignment sleeves 37 and a plurality of seals described hereinbelow. The connector 13 may optionally be considered as including one or more fiber optic termini 39. The connector pair 11 may be used to couple two of the fiber optic termini, in which event, each of the connectors 13 and 13a would have one fiber optic terminus. However, in this embodiment, the connector pair 11 couples twelve of the fiber optic termini 39, and so there are six of the fiber optic termini in each of the connectors 13 and 13a. The number of the graded index rods 33, bushings 35 and the alignment sleeves 37 equal the number of fiber optic termini 39, and as shown in FIG. 3, there are six identical index rods 33 in the connector 13. Of course, the connector pair 11 can be used to couple different numbers of the fiber optic termini 39.

The connector body 31 includes a first or inner body section 41, a second or intermediate body section 43 and a carrier 45 adapted to receive and carry the fiber optic termini 39. Six identical passages 47 (only one being shown in FIG. 1) extend in an axial direction through the connector body 31, with portions of the passages 47 lying in each of the body sections 41 and 43 and in the carrier 45. More specifically, the portion of each of the passages 47 which extends through the inner body section 41 is formed by a bore 49 (FIG. 2) and a counterbore 51. The counterbore 51 terminates in an end wall 53, and an annular seal groove 55 surrounds the counterbore 51 at an inner end 57 of the inner body section 41.

The bushing 35 is fixedly retained in the counterbore 51 in any suitable manner, such as by a press fit, and has a bushing passage 59 extending axially completely through the bushing. The bushing also has a radially inwardly projecting annular shoulder 61 in the bushing passage 59. The shoulder 61 has an annular, peripheral conical surface 63, and the graded index rod 33 has a mating conical surface 65. The counterbore 51 is cylindrical, and the bushing 35 has an external cylindrical surface 67 which is coaxial with the conical surface 65 and the counterbore 51.

A resilient annular seal 69 surrounds the graded index rod 33 between the bushing 35 and the end wall 53 to seal the space between the graded index rod and the inner body section 41. A resilient annular interface seal 71 circumscribes the bushing 35 at the inner end 57 and is retained in the groove 55 by retaining means in the form of an annular flange 73 on the bushing 35. The seal 71 prevents liquid and dirt from getting between the bushing 35 and the inner body section 41. In addition, the seal 71 protrudes axially beyond the inner end 57 in the condition shown in FIG. 2 to eliminate optical interference among the several graded index rods 33 when the connector pair is assembled as shown in FIG. 1. When so assembled, the seal 71 is deformed by the corresponding seal 71a (FIG. 1) and tightly loaded to assist it in accomplishing these functions. An annular space 75 (FIG. 2) provides a gap in which the material of the seal can extrude when subjected to compressive loads. From the foregoing, it can be seen that the bushing 35 performs the important functions of positioning and retaining the graded index rod 33 and retaining the seals 69 and 71.

Figure 2:
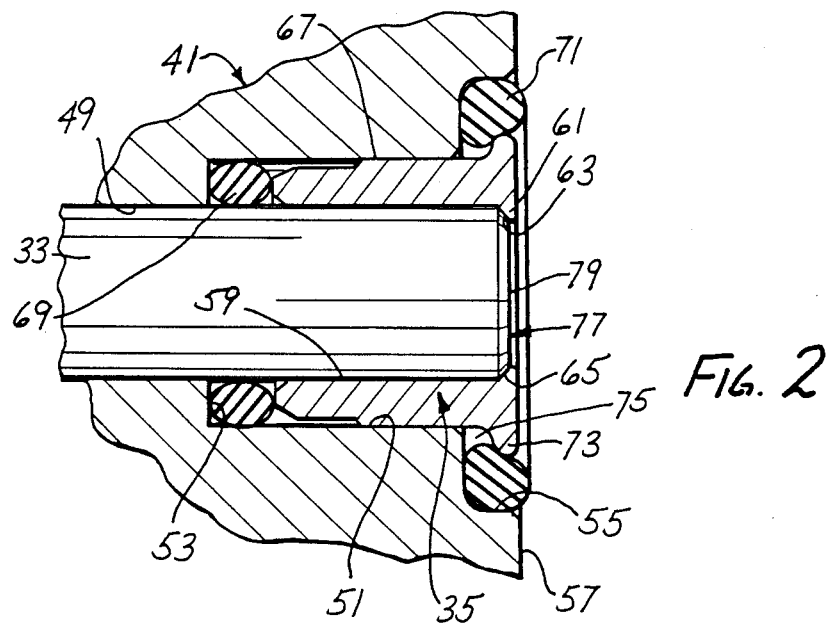
FIG. 2 is an enlarged, fragmentary sectional view illustrating one of the bushings and graded index rods and the adjacent structure.

Each of the graded index rods 33 is slidably received within the associated passage 47 and the associated bushing passage 59. Accordingly, each of the graded index rods 33 can be pushed axially against the conical surface 63 to thereby accurately position the graded index rods and retain them against movement to the left as viewed in FIG. 2 out of the associated bushings 35. Each of the graded index rods 33 has an end face 77 which includes a circular, flat planar region 79, and the conical surface 65, which surrounds the flat region 79. The flat region 79 comprises a large percentage of the total surface area of the end face 77. The construction shown in FIG. 2 is typical for all six of the bushings 35 and the graded index rods 33, and corresponding reference numerals are used to designate corresponding parts.

To assure that the connectors 13 and 13a are correctly clocked, i.e., placed together in the correct angular orientation, the inner body section 41 includes a dowel pin 81 (FIG. 3) and a socket 83 (FIG. 3 and 4). With this construction, the dowel pin 81 of the connectors 13 is received by the socket (not shown) of the connector 13a, and the dowel pin (not shown) of the connector 13a is received within the socket 83 of the connector 13.

The inner body section 41 has an axially outwardly opening cavity 85 (FIG. 4) and an internally threaded projection 87 extending axially into the cavity 85. A resilient annular seal 89 is provided in an external seal groove on the inner body section 41.

The intermediate body section 43 is seized and configured to be received within the recess 85 and, for that purpose, has a recess 91 for receiving the projection 87. The body sections 41 and 43 are releasably interconnected by a screw 93 which is recessed in a bore 95 of the intermediate body section 43. An annular retainer 97 is threadedly received within the outer end of the bore 95 to prevent the screw 93 from falling out of the bore when the body sections 41 and 43 are disconnected.

As shown in FIGS. 1 and 4, the alignment sleeves 37 are received within the portions of the passages 47 which lie within the intermediate body section 43. The alignment sleeves 37 are identical and conventional and may be of the type disclosed in Moulin Pat. No. 4,707,068 assigned to the asignee of record herein. This patent is incorporated by reference herein. The alignment sleeves 37 are slotted and can be readily slid over the associated graded index rod 33. Each of the alignment sleeves 37 has a terminus receiving section 99 which is adapted to receive a portion of an associated fiber optic terminus 39. More specifcially, the portion of the passage 47 within the intermediate body section 43 includes a relatively large diameter bore 101 (FIG. 4) in which the associated alignment sleeve 37 is received, and a relatively small-diameter bore 103 which provides an annular shoulder 105 which prevents withdrawal of the alignment sleeve 37 in that direction out of the associated passage 47. This construction is typical for all six of the passages 47. As shown in FIG. 4, the alignment sleeve 37 bears against the inner body section 41 at one end and is spaced slightly at the other end from the shoulder 105. The intermediate body section 43 has a hollow central projection 106.

The carrier 45 (FIG. 1) is seized and configured to be received within the cavity 85 and, for that purpose, has a central bore 107 (FIG. 1) which receives the projection 106 of the intermediate body section 43. A screw 109 extends through the bore 107 and the projection 106 into the internally threaded projection 87 of the inner body section 41 to releasably attach the carrier to the inner body section.

The passages 47 also extend axially through the carrier 45, and more specifically, the portions of the passages 47 in the carrier 45 are formed by bores 111 (only one being shown in FIG. 1.) The carrier 45 has means for releasably retaining the termini 39 in the associated bores 111. Although such means may be of various different constructions, in the illustrated embodiment, it includes an annular internal rib 113 in each of the bores 111 for cooperating with a conventional retainer 115 of the fiber optic termini to releasably retain the termini in the associated bore.

The fiber optic termini 39 may be identical and of conventional construction. For example, the termini 39 may be of the type shown and described in common assignee's co-pending application Ser. No. 091,932 filed Sept. 1, 1987, which is incorporated by reference herein. Each of the fiber optic termini 39 may include a housing 117, a seal 119 surrounding the housing, the retainer 115 which is slidable. longitudinally on the housing, an optical fiber 121, a spring retainer 122 slidable on the housing, a belleville spring 123 and a fixed spring retainer 124. Each of the fiber optic termini 39 also has a bushing 125 which is slidably received within the section 99 of the alignment sleeve 37. An annular seal 127 seals the peripheral interface between the carrier 45 and the intermediate body section 43.

With the connector 13 assembled as shown in FIG. 1, the bushings 125 are received within the sections 99 of the associated alignment sleeves 37. The connectors 13 and 13a push the spring retainers 122 and 122a (FIGS. 1 and 5) against the springs 123 and 123a to urge the associated graded index rods 33 and 33a toward each other and to bias the conical surfaces 63 and 65 (FIG. 2) into engagement. In this regard, the bushing 125 engages an outer end 129, either directly or through a floating spacer (not shown) carried by the alignement sleeve 37 to urge the graded index rod against the shoulder 61 of the associated bushing 65.

When the connectors 13 and 13a are coupled together by the coupling 15, the graded index rods 33 of the connector 13 are axially aligned, respectively, with the graded index rods 33a of the connector 13a. Each of the graded index rods 33 expands and collimates the beam from the associated fiber optic terminus 39 to provide an expanded and collimated beam at the inner end 57 of the connector 13. The associated graded index rods 33a refocus the beam onto the optical fibers 121a. For this purpose, each of the graded index rods 33 and 33a may have a pitch of 0.75. Each of the graded index rods 33 and 33a is accurately positioned by the associated bushing 35 and 35a. Optical interference adjacent graded index rods of each connector is precluded by the seals 71.

To disassembled the connector 13, the screw 109 is removed to thereby permit separation of the carrier 45 from the body sections 41 and 43. The bushings 125 can be easily slid out from the sections 99 of the alignment sleeves 37 as the carrier 45 is removed from the body sections 41 and 43. This leaves the structure shown in FIG. 4, an to further disassemble this sturcture, the screw 93 is removed to thereby permit separation of the body sections 41 and 43. Following this, the graded index rods 33 can be slid out of the portion of the passages 47 in the inner body section 41, and if desired, the alignment sleeves 37 can be slid off of the graded index rods. Consequently, the connectors 13 and 13a can be completely disassembled for cleaning, repair and maintenance without disturbing the fiber optic termini 39.

Although an exemplary embodiment of the invention has been shown and described, many changes, modifications and substitutions may be made by one having ordinary skill in the art without necessarily departing from the spirit and scope of this invention.

What is claimed is:

1. A lens-type connector comprising:
 a connector body having a passage extending therethrough in a first direction;
 a bushing fixedly retained in the passage of the connector body and having a bushing passage extending generally in said first direction completely through the bushing, the passage including a bore and a counterbore at the end of the connector body, said bushing received in the counterbore;
 said bushing having a radially inwardly projecting shoulder in said passage of said bushing and an annular interface seal circumscribing the bushing at said one end of the connector body and means including the bushing for retaining the seal; and
 a graded index rod in said passages, said graded index rod having an end face and being movable in said first direction in said passages, said shoulder and the end face of said graded index rod having mating conical surfaces which engages when the index rod is urged against the shoulder, whereby the end face of the graded index rod can be urged against said shoulder to at least assist in centering and retaining the graded index rod in said passages.

2. A lens-type connector comprising:
 a connector body having a passage extending therethrough in a first direction;
 a bushing fixedly retained in the passage of the connector body and having a bushing passage extending generally in said first direction completely through the bushing, the passage including a bore and a counterbore at the end of the connector body, said bushing received in the counterbore, wherein the counterbore terminates inwardly in an end wall;
 said bushing having a radially inwardly projecting shoulder in said passage of said bushing;
 a graded index rod in said passages, said graded index rod having an end face and being movable in said first direction in said passages, said shoulder and the end face of said graded index rod having mating conical surfaces which shoulder, whereby the end face of the graded index rod can be urged against said shoulder to at least assist in centering and retaining the graded index rod in said passages; and
 an annular seal surrounding the graded index rod between the bushing and the end wall.

3. A lens-type connector comprising:

a connector body having a passage extending therethrough in a first direction, the connector body including first and second body sections and means for releasably attaching the second body section to the first body section, portions of the passage of the connector body are in each of the first and second body sections, said bushing is carried by the first body section and the graded index rod projects into the passage of the connector body in the second body section;

a bushing fixedly retained in the passage of the connector body and having a bushing passage extending generally in said first direction completely through the bushing;

said bushing having a radially inwardly projecting shoulder in said passage of said bushing; and a graded index rod in said passages, said graded index rod having an end face and being movable in said first direction in said passages, said shoulder and the end face of said graded index rod having mating conical surfaces which engage when the graded index rod is urged against the shoulder, whereby the end face of the graded index rod can be urged against said shoulder to at least assist in centering and retaining the graded index rod in said passages.

4. A connector as defined in claim 3 including an alignment sleeve on the graded index rod and in the passage of the connector body in the second body section, said alignment sleeve being adapted to receive a portion of a fiber optic terminus.

5. A connector as defined in claim 3 wherein the connector body includes a carrier for at least one fiber optic terminus and means for releasably attaching the carrier to at least one of said first and second body sections with the second body section being between carrier and the first body section and said carrier is adapted to receive at least one fiber optic terminus.

6. A connector as defined in claim 5 wherein said shoulder and the end face of said graded index rod have mating conical surfaces which engage when the graded index rod is urged against the shoulder, the passage of the connector body includes a bore and a counterbore at one end of the connector body and the bushing is received in the counterbore, and the connector includes an annular interface seal circumscribing the bushing at said one end of the connector body and means including the bushing for retaining said seal.

7. A connector as defined in claim 5 including a fiber optic terminus carried by the carrier and including means for biasing the graded index rod against said shoulder.

8. A lens-type connector comprising:
a connector body having a passage extending therethrough in a first direction;
a graded index rod in said passage, said graded index rod having an end face and being movable in said first direction in said passage;
means for positioning the graded index rod in said passage;
said connector body including first and second body sections, a carrier adapted to receive at least one fiber optic terminus and means for releasably attaching the body sections and the carrier;
an alignment sleeve on the graded index rod and in the passage of the connector body in the second body section, said alignment sleeve being adapted to releasably receive a portion of a fiber optic terminus; and
portions of the passage of the connector body being in each of the first and second body sections, the graded index rod projecting into the passage of the connector body in the second body section and being retained in said connector body passage when said second body section is attached to said first body section whereby the lens-type connector can be readily disassembled for repair or replacement of components.

9. A lens-type connector comprising:
a connector body having a passage extending therethrough in a first direction;
a graded index rod in said passage, said graded index rod having an end face and being movable in said first direction in said passage;
means for positioning the graded index rod in said passage;
said connector body including first and second body sections, a carrier adapted to receive at least one fiber optic terminus and means for releasably attaching the body sections and the carrier, wherein said releasably attaching means includes first means for releasably attaching the first and second body sections and second means for releasably attaching the carrier to the first and second body sections; and
portions of the passage of the connector body being in each of the first and second body sections, the graded index rod projecting into the passage of the connector body in the second body section and being retained in said connector body passage when said second body section is attached to said first body section whereby the lens-type connector can be readily disassembled for repair or replacement of components.

* * * * *